US005563641A

United States Patent [19]

Plesinger

[11] Patent Number: 5,563,641

[45] Date of Patent: Oct. 8, 1996

[54] REMOVABLE ORIFICE PLATE FOR INK JET PRINTHEAD AND SECURING APPARATUS

[75] Inventor: Boris Plesinger, Scottsdale, Ariz.

[73] Assignee: Compaq Computer Corporation, Houston, Tex.

[21] Appl. No.: 311,193

[22] Filed: Sep. 23, 1994

[51] Int. Cl.[6] .......... B41J 2/135; G01D 15/16

[52] U.S. Cl. .......... 347/47

[58] Field of Search .......... 347/47, 40

[56] References Cited

U.S. PATENT DOCUMENTS

| | | | |
|---|---|---|---|
| 4,110,759 | 8/1978 | Stoneburner | 347/47 |
| 4,528,575 | 7/1985 | Matsuda et al. | 347/47 |
| 4,623,904 | 11/1986 | Conta et al. | 347/47 |

*Primary Examiner*—Valerie A. Lund

*Attorney, Agent, or Firm*—Konneker & Smith

[57] ABSTRACT

The present invention provides a removable orifice plate securing structure for use in conjunction with a conventional ink jet printer printhead assembly. The orifice plate securing structure comprises an orifice plate mounting member having a rear end portion disposed in an opposing relationship with the front end surface of the printhead body portion, a front side surface and an opening extending outwardly from the rear end portion to the front side surface. The orifice plate mounting member is configured to removable secure the orifice plate between the front side surface of the orifice plate mounting member and the front end surface of the printhead body portion in an operative alignment position with the ink receiving chambers. The opening is configured to allow ink from the ink discharge orifices to operatively pass outwardly from the orifice plate mounting member. The orifice plate securing structure also comprises a securing means for removable securing the orifice plate mounting member and the orifice plate to the printhead body portion in an operative alignment position with the ink receiving chambers.

9 Claims, 3 Drawing Sheets

REMOVABLE ORIFICE PLATE FOR INK JET PRINTHEAD AND SECURING APPARATUS

BACKGROUND OF THE INVENTION

1. Field of the Invention

The present invention generally relates to printhead assembly apparatus used in ink jet printers, and more particularly relates to a removable orifice plate and associated securing apparatus for such printhead assemblies.

2. Description of Related Art

A conventionally fabricated printhead assembly for an ink jet printer typically includes a piezoelectric ceramic body portion through which a spaced apart series of parallel ink receiving chambers or cavities extend from the front end of the body to its rear end. The open chamber ends at the rear end of the body are suitably communicated with the interior of an ink reservoir to receive ink therefrom, and an orifice plate, which is comprised of a dissimilar material such as a polymer, is secured over the open front end of the body using a generally planar layer of high strength adhesive material. A spaced series of ink discharge orifice openings are formed through the orifice plate, and are aligned with and positioned over the open front ends of the body chambers.

In such conventional printheads, the orifice plates are permanently secured to the front end of the printhead assembly by a strong adhesive. Generally, the orifice plate is secured in place by an adhesive that is applied either to the rear end surface of the orifice plate or the front end surface of the printhead body. The typical adhesives that are used to secure the orifice plate to the printhead body are "activated" or cured by subjecting the printhead assembly to high temperatures. After the adhesive has cured, the orifice plate is permanently bonded to the printhead body.

Because the orifice plate is permanently bonded to the printhead assembly, several disadvantages can arise with the use of these conventional ink jet printhead assemblies. For example, because of the differing coefficients of thermal expansion between the materials, the ink discharge orifices of the orifice plate can become misaligned with the ink receiving chambers when the printhead assembly is subjected to the high temperatures necessary to cure the adhesive properly. Since the ink discharge orifices and its features are extremely small, the dimensional tolerances on the size and location of these features are equally small. Therefore, any misalignment that may occur during the curing process can have a detrimental effect on the quality and the performance of the ink jet printhead. Thus, if a misalignment occurs during the assembly process that substantially affects the print quality, the entire printhead assembly must be disposed of because there is no effective way to easily remove the orifice plate from the printhead. If the defective printhead is inadvertently sold and used by a purchaser, the purchaser must either return the printhead to the place of purchase or throw the entire defective printhead assembly away since the orifice plate is permanently attached to the printhead body. Additionally, the conventional adhesives that may be used to attach the orifice plate to the body portion, must also act as a sealing gasket to seal the printhead assembly and prevent ink from leaking between the channels or various segregated areas of the printhead. Unfortunately, however, the strong solvent nature of most inks chemically attacks many common adhesives, thereby weakening the adhesive and causing structural failure and leakage. Again, if structural failure or leakage occurs as the result of the adhesive failure, the entire printhead assembly must be thrown away because the purchaser has no way of effectively reattaching and sealing the orifice plate to the printhead body.

In other instances, after the adhesive is applied to the body portion and during the step in which the orifice plate is positioned on the printhead body, the adhesive may seep into and plug the ink receiving chambers and the orifice holes. If these plugged printheads are inadvertently used by a purchaser, the purchaser, again, has no alternative but to either return the printhead, throw the entire printhead assembly away or endure an unacceptable print quality. Additionally, during operation of the printhead, the ink can become dry and plug several of the tiny discharge orifices in the orifice plate. When this occurs, the purchaser must either endure a poor print quality or throw the entire printhead assembly away.

In each instance just described, the way in which the problem of a defective orifice plate is remedied by the purchaser, and in many instances by the manufacturer, is to dispose of the entire printhead assembly. These end results are undesirable because they are costly and wasteful to both the manufacturer and the purchaser.

Therefore, it can readily be seen that there is a need in the art for a securing assembly that will allow the orifice plate to be easily removed and replaced in the case of defect or failure. The present invention provides an apparatus that addresses these needs.

SUMMARY OF THE INVENTION

In carrying out principles of the present invention, in accordance with a preferred embodiment thereof, there is provided a removable orifice plate securing structure for use in conjunction with an ink jet printer printhead assembly. The conventional printhead assembly has a printhead body portion, a front end surface, a rear end surface and ink receiving chambers opening outwardly through the front end surface of the printhead body portion. Also included with the conventional printhead assembly is a removable orifice plate that has ink discharge orifices formed therethrough, a front end surface and a rear end surface.

The orifice plate securing structure comprises an orifice plate mounting member having a rear end portion disposed in an opposing relationship with the front end surface of the printhead body portion, a front side surface and an opening extending outwardly from the rear end portion to the front side surface. The orifice plate mounting member is configured to removably secure the orifice plate between the front side surface of the orifice plate mounting member and the front end surface of the printhead body portion in an operative alignment position with the ink receiving chambers. The opening is configured to allow ink from the ink discharge orifices to operatively pass outwardly from the printhead assembly through the orifice plate mounting member.

The orifice plate securing structure also comprises a securing means for removably securing the orifice plate mounting member and the orifice plate to the printhead body portion in an operative alignment position with the ink receiving chambers. In one embodiment, the securing means is integrally formed with the orifice plate mounting member and further has a clamping end portion that is removably securable to the rear end surface of the printhead body portion. In yet another embodiment, the securing means is a spring formed clamping mechanism having first and second end portions wherein the first end is removably securable to the front end surface of the orifice plate mounting member and the second end is removably securable to the rear end surface of the printhead body portion. In a preferred embodiment of this aspect of the invention, the securing means are a pair of spring formed clamping mechanisms that are securable to the opposite sides of the orifice plate mounting member and the printhead body portion.

A sealing means is also provided in the embodiment described above. The sealing means is configured to effectively seal and prevent leakage of ink between the ink receiving channels and from the printhead assembly in general. The sealing means may be an independent sealing material, or it may be a part of the orifice plate itself. Preferably, however, the sealing means is a thin layer of silicon that is secured to the rear side surface of the orifice plate. The sealing means is also configured with openings to allow the ink to flow from the ink receiving channels through the ink discharge orifices in the orifice plate. The openings may be formed simultaneously with the formation of the ink discharge orifices by laser ablation when the sealing means is a part of the orifice plate, or the openings may be formed independently when the sealing means is separate from the orifice plate.

In yet another embodiment, the orifice plate mounting member is a housing member having an open rear end portion, a front side surface, and an inner side surface and an outer side surface extending rearwardly from the front side surface to the open rear end portion. In this particular embodiment, the front side surface has an opening therein configured to allow ink from the ink discharge orifices to operatively pass outwardly through the opening, and the inner side surface has a recessed portion therein that is adjacent the opening and configured to receive the orifice plate. The orifice plate may be secured to the recessed portion by an adhesive if so desired, otherwise, the orifice plate is easily removable from the recessed portion. Additionally, the open rear end portion of the housing member is configured to slidably receive the front end surface of the printhead body portion.

In another aspect of the present invention, there is provided a printhead assembly for use in an ink jet printer. The assembly comprises a printhead body, a removable orifice plate, an orifice plate mounting member and a securing means for removably securing the orifice plate and orifice plate mounting member to the printhead body portion. The printhead body portion is formed from a piezoelectric material and has a front end surface, a rear end surface and a spaced apart interior series of ink receiving chambers opening outwardly through the front end surface. The removable orifice plate has an ink discharge orifice array formed therethrough, a rear side surface disposed in an opposing, closely adjacent relationship with the front end surface of the printhead body portion and a front side surface.

The orifice plate mounting member, securing means and sealing means as previously described are also provided in this particular embodiment, including the previously discussed alternate embodiments of each. In yet another aspect of this particular embodiment, the mounting member may also be a housing member as previously described above for the other embodiments.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

DETAILED DESCRIPTION

Figure 1A:
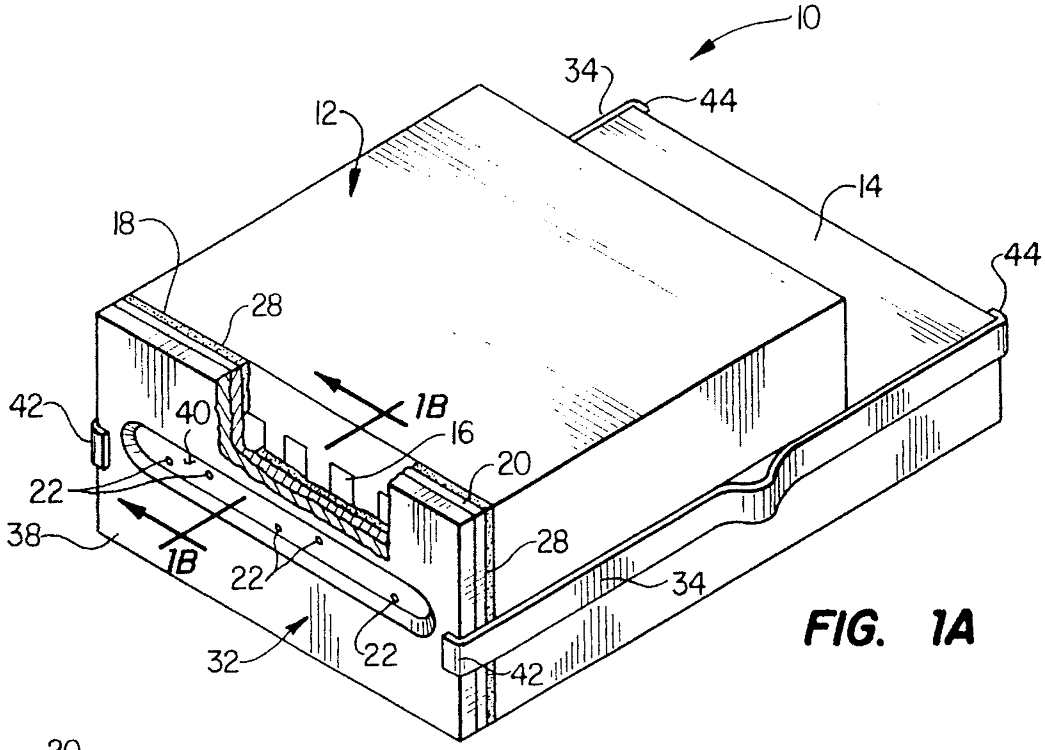
FIG. 1A illustrates a perspective view of a printhead assembly with the orifice plate mounting member and orifice plate secured thereto by the securing means.
Figure 1B:
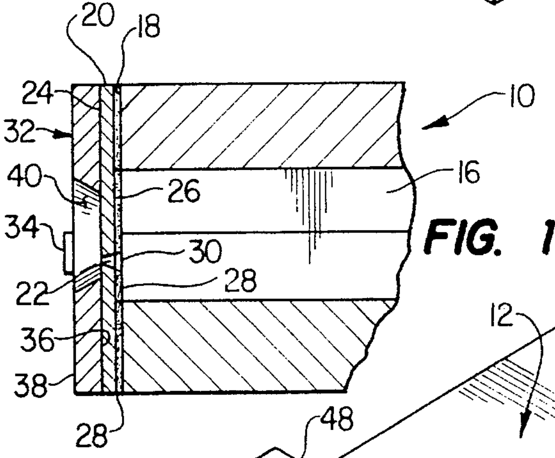
FIG. 1B illustrates a cross-sectional side view of FIG. 1A view taken along the line 1B—1B.

Referring initially to FIGS. 1A and 1B, in a preferred embodiment thereof, there is provided a printhead assembly 10 having a printhead body portion 12 with a rear end surface 14 and ink receiving chambers 16 opening outwardly through a front end surface 18 of the printhead body portion 12. The printhead body portion 12 is preferably comprised of a piezoelectric material, and more preferably, is comprised of a piezoelectric ceramic material. Closely adjacent to the front end surface 18 is a removable orifice plate 20, which may be comprised of a very thin metallic material or a thermoplastic polymer material, such as a polyimide, polyester or polysulfone. The orifice plate 20 is easily removable from the printhead body portion 12 and is not permanently secured with adhesive as in conventional printhead assemblies, but is instead, removably secured by means as described herein below. The orifice plate 20 has ink discharge orifices 22 formed therethrough, a front side surface 24 and a rear side surface 26 disposed in an opposing, closely adjacent relationship with the front end surface 14 of the printhead body portion 12.

Positioned and sealing secured between the front end surface 18 of the printhead body portion 12 and the rear side surface 26 of the orifice plate 20 is a sealing means 28 that seals the ink receiving chambers 16 and prevents a flow of ink therebetween and from the printhead assembly 10 in general. The sealing means 28 may be an independent sealing material, or it may be a part of or secured to the orifice plate 20. The sealing means 28 is also configured with sealing means openings 30 to allow the ink to flow from the ink receiving chambers 16 through the ink discharge orifices 22. The sealing means openings 30 may be formed simultaneously with the formation of the ink discharge orifices 22 by laser ablation when it is a part of the orifice plate 20, or they may be formed independently when the sealing means 28 is separate from the orifice plate 20. Preferably, the configuration is in the form of tiny orifices that are aligned and formed simultaneously by laser ablation with the formation of the ink discharge orifices 22 when the sealing means 28 is a part of or secured to the rear side surface 26 of the orifice plate 20.

The sealing means 28 is preferably comprised of a thin layer of silicone that is secured to the rear side surface 26 of the orifice plate 20. However, the sealing means 28 may be other types of pre-formed sealing materials, such as gaskets that may or may not be attached to the orifice plate 20.

The orifice plate 20 is removably secured to the front end surface 18 of the printhead body portion 12 by a removable orifice plate mounting member 32 in cooperation with a securing means 34. The orifice plate mounting member 32 has a rear end portion 36 disposed in an opposing relationship with the front end surface 18 of the printhead body portion 12 and a front side surface 38. Extending outwardly from the rear end portion 36 to the front side surface 38 of the orifice plate mounting member 32 is an mounting member ink discharge opening 40.

The orifice plate mounting member 32 is configured to removably secure the orifice plate 20 between the front side surface 38 of the orifice plate mounting member 32 and the front end surface 18 of the printhead body portion 12 in an operative alignment position with the ink receiving chambers 16. What is meant by operative alignment is that the ink discharge orifices 22 are properly aligned with the ink receiving chambers 16 to effectively and accurately discharge the ink from the printhead assembly 10 when the orifice plate 20 and the orifice plate mounting member 32 are properly secured to the printhead body portion 12.

The orifice plate mounting member ink discharge opening 40 is configured to allow ink from the ink discharge orifices 22 to operatively pass outwardly from the printhead assembly 10 through the orifice plate mounting member 32. In other words, none of the ink discharge orifices 22 are blocked by the orifice plate mounting member 32, and the orifice plate mounting member ink discharge opening 40 does not interfere with the ink jet spray pattern and thus, effectively allows the ink to be discharged from the printhead assembly 10.

As previously mentioned, the orifice plate 20 and the orifice plate mounting member 32 are removably secured to the printhead body portion 12 by the securing means 34. While the securing means 34 can be any type of securing mechanism such as an interlocking teeth-latchet means or ball and socket means or some other similar securing means, the securing means 34 is preferably a spring-formed clamping mechanism, as illustrated in FIG. 1A, that frictionally engages the printhead body portion 12 and the orifice plate mounting member 32. The securing means 34 preferably has a first clamping end 42 that is removably securable to the front side surface 38 of the orifice plate mounting member 32 and a second clamping end 44 that is removably securable to the rear end surface 14 of the printhead body portion 12. In such instances where the securing means 34 is a spring-formed clamp, the orifice plate mounting member 32 and the orifice plate 20 are secured to the printhead body portion 12 by the clamping force exerted by the securing means 34 at the opposing ends of the printhead assembly 10. Preferably, however, the securing means 34 are a pair of spring formed clamping mechanisms that are securable to opposite sides of the printhead assembly 10 as illustrated in FIGS. 1A and 1B. The securing means 34 may be made of flexible metal or plastic materials.

Alternatively, as will be later described herein, the securing means 34 may also be integrally formed with the orifice plate mounting member 32. In such instances, the securing means 34 may have only one pair of clamping end portions that are removably securable to the rear end surface 14 of the printhead body portion 12.

Figure 2:
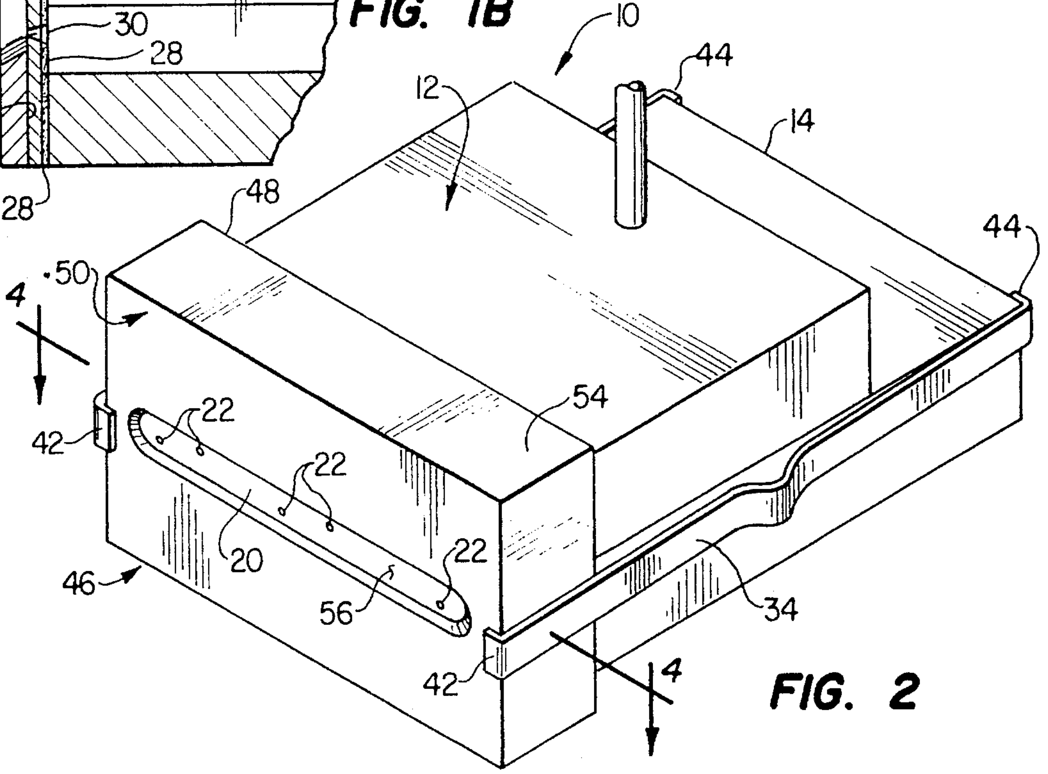
FIG. 2 illustrates a perspective view of a printhead assembly with the housing member and orifice plate secured thereto by the securing means.
Figure 3:
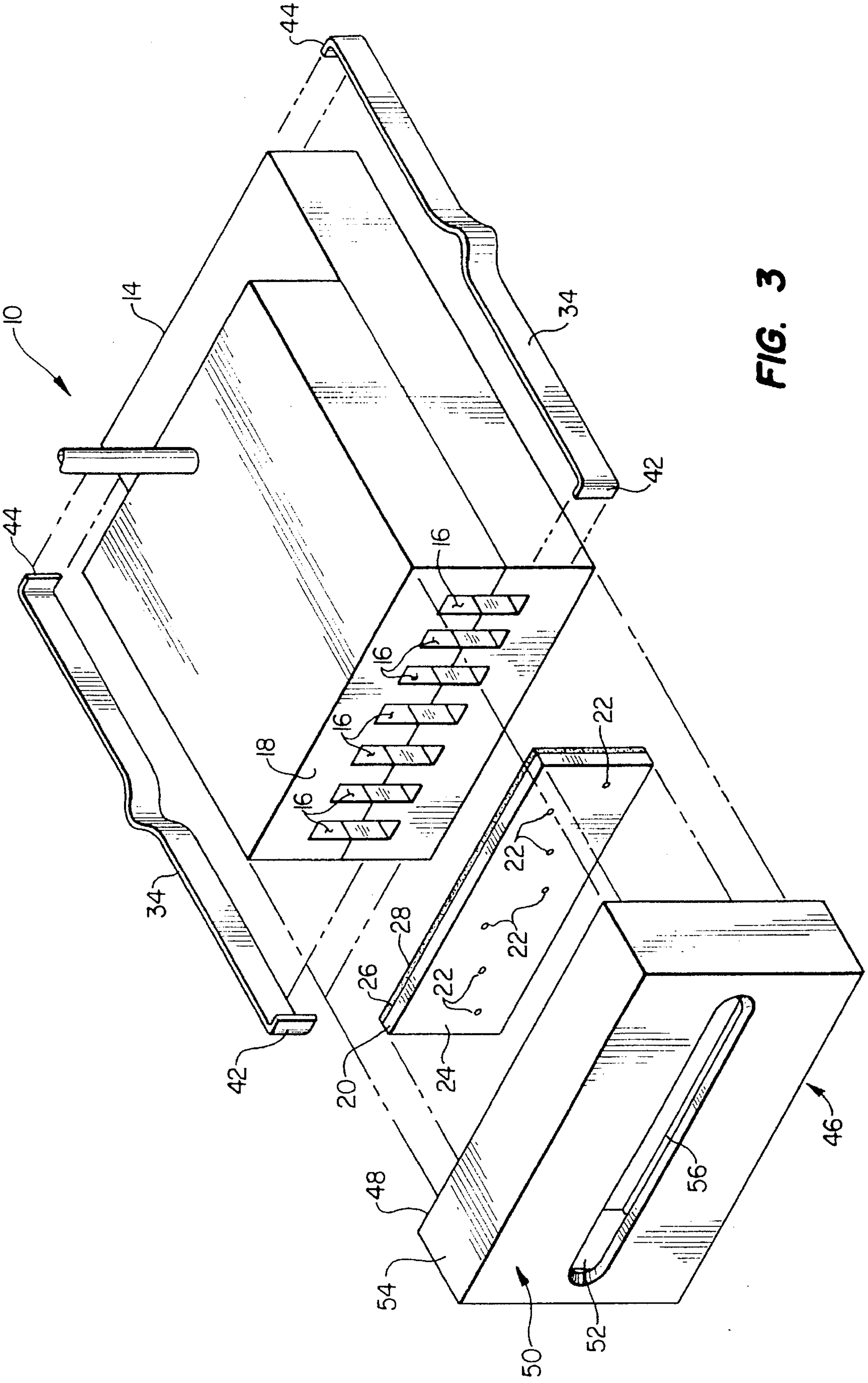
FIG. 3 illustrates a perspective exploded view of FIG. 2.

Turning now to FIGS. 2 and 3, there is illustrated an alternate embodiment of the present invention. In this embodiment, the orifice plate mounting member 32 is a housing member 46 having an open rear end portion 48, a front side surface 50 and an inner side surface 52 and outer side surface 54 extending rearwardly from the front side surface 50 to the open rear end portion 48. The front side surface 50 has a housing member ink discharge opening 56 therein configured to allow ink from the ink discharge orifices 22 to operatively pass outwardly from the printhead assembly 10 through the housing member 46. The front side surface 50 of the housing member 46 is configured to receive the first clamping end 42 of the securing means 34 and secure the orifice plate 20 between the housing member ink discharge opening 56 and the front end surface 18 of the printhead body portion 12. The sealing means 28 is positioned between the rear side surface 26 of the orifice plate 20 and the front end surface 18 of the printhead body portion 12 to seal the ink receiving chambers 16 and the printhead assembly 10 in general. When the housing member 46 is secured by the securing means 34, the ink discharge orifices 22 and the sealing means 28 are secured in operative alignment with the ink receiving chambers 16.

Figure 4:
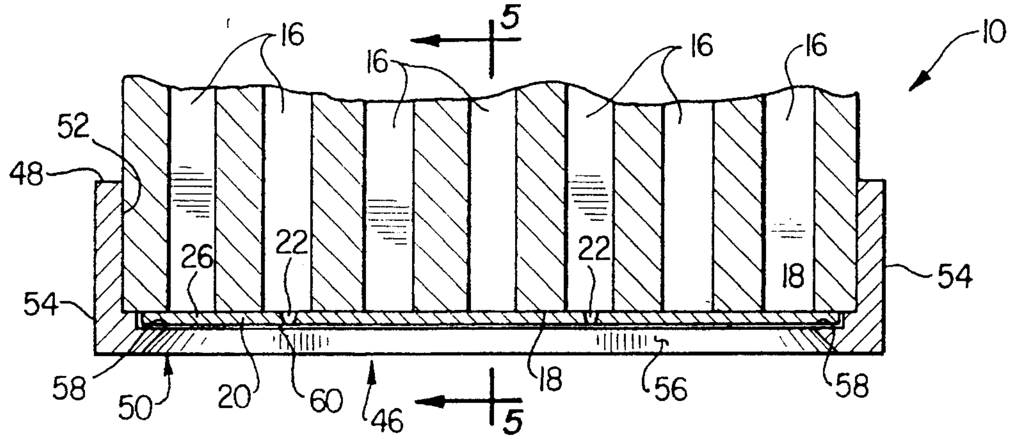
FIG. 4 illustrates a cross-sectional side view of FIG. 2 taken along the line 4—4.
Figure 5:
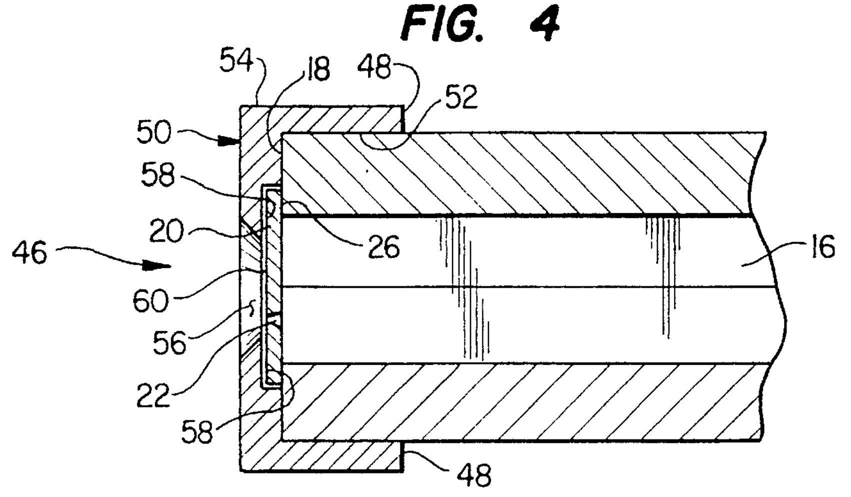
FIG. 5 illustrates a cross-sectional top view of FIG. 4 taken along the line 5—5.

Turning now to FIGS. 4 and 5, the embodiment just described is illustrated in cross-section. The inner side surface 52 of the housing member 46 has a recessed portion 58 therein adjacent the housing member ink discharge opening 56. The recessed portion 58 is configured to receive the orifice plate 20 within the interior portion of the housing member 46 and hold the orifice plate 20 between the housing member ink discharge opening 56 and the front end surface 18 of the printhead body portion 12. An adhesive 60 may be used to hold the orifice plate 20 in the recessed portion 58, if so desired. Alternatively, however, the recessed portion 58 may be configured to tightly secure and hold the orifice plate 20 without the use of an adhesive.

The housing member 46 and its open rear end portion 48 are preferably configured to slidably receive the front end surface 18 of the printhead body portion 12 and seal it against the rear side surface 26 of the orifice plate 20, as illustrated in FIGS. 4 and 5. When so positioned, the sealing means 28 (see FIG. 3) seals the ink receiving chambers 16 as previously discussed. Of course, it should be recognized that alternate embodiments could include those configurations where the printhead body portion slidably receives the orifice plate mounting housing member to operatively align and seal the orifice plate with the ink receiving chambers as well.

Figure 6:
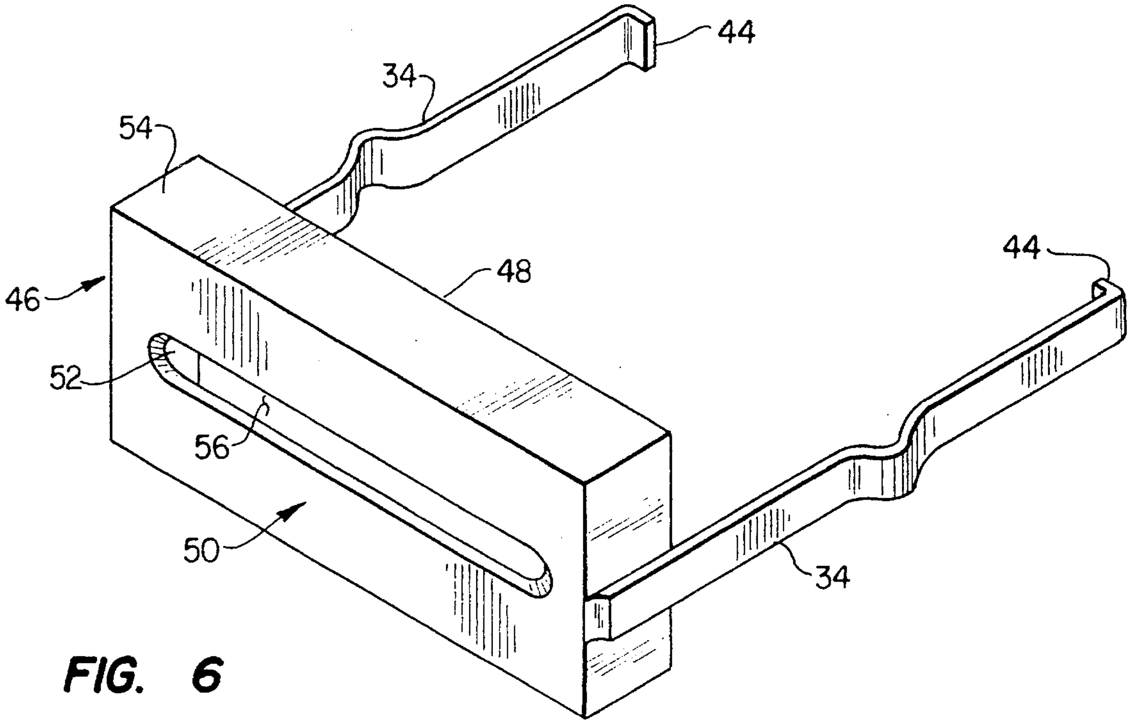
FIG. 6 illustrates a perspective view of the housing member with the securing means integrally formed therewith.

Turning now to FIG. 6, there is illustrated yet another embodiment of the housing member 46 having the securing means 34 integrally formed therewith. The securing means 34 are preferably formed within the outer side surface 54 of the housing member 46 with the second clamping end portions 44 extending rearwardly therefrom to engage the rear end portions of the printhead body (not shown).

In operation, if the orifice plate becomes plugged, the operator may change out the orifice plate by removing the orifice plate mounting member by disengaging the securing means from the printhead body or the mounting member. Once the securing means is disengaged, the mounting member may be easily removed from the printhead assembly. The orifice plate may then be easily accessed and replaced with a new orifice plate.

In those embodiments where the orifice plate is adhesively secured to the recessed portion of the housing member, the entire housing member and orifice plate will be replaced by a new housing member having a new orifice plate adhesively secured therein. The clamps are re-engaged and the printhead is ready to use.

From the foregoing, it is seen that the present invention provides a removable orifice plate securing structure that allows the operator to easily replace the orifice plate when it has become clogged or plugged.

Although the present invention and its advantages have been described in detail, it should be understood that various changes, substitutions and alterations can be made herein without departing from the spirit and scope of the invention as defined by the appended claims.

What is claimed is:

1. A printhead assembly for use in an ink jet printer, said printhead assembly comprising:

a printhead body portion formed from a piezoelectric material and having an essentially planar and projectionless front end surface, an essentially planar rear end surface, essentially planar opposite side surfaces extending between said front and rear end surfaces, and a spaced apart interior series of ink delivery chambers having discharge portions opening outwardly through said front end surface;

a removable orifice plate having a spaced series of ink discharge orifices formed therethrough, said orifice plate being disposed in a parallel, facing relationship with said front end surface of said printhead body portion with said ink discharge orifices being in an operative, facing alignment with said discharge portions of said ink delivery chambers, said orifice plate having a forwardly facing outer side surface;

a resilient seal structure interposed between said orifice plate and said front side of said printhead body portion and having an opening portion through which said ink discharge orifices are communicated with said ink delivery chamber discharge portions, said resilient seal structure being operatively compressible between said orifice plate and said front end surface of said printhead body portion to (1) form a continuous ink seal disposed therebetween and extending around the aligned ink discharge orifices and said discharge portions of said ink delivery chambers, and (2) frictionally maintain said orifice plate in operative alignment with said front end surface of said printhead body portion;

a retaining member positioned against said outer side surface of said orifice plate and having an opening through which said ink discharge orifices are exposed; and a resilient mounting structure forcibly holding said retaining member against said outer side surface of said orifice plate in a manner (1) captively and removably retaining said orifice plate in place on said printhead assembly and (2) operatively compressing said resilient seal structure, said resilient mounting structure including a pair of resilient mounting portions secured at front ends thereof to said retaining member, extending from said retaining member rearwardly along said opposite side surfaces of said printhead body portion, and having rear end portions extending along and forcibly engaging said rear end surface of said printhead body portion.

2. The printhead assembly of claim 1 wherein:

said resilient mounting portions are a pair of elongated spring clip members removably supported on said printhead assembly, each of said resilient mounting portions having transverse front end portions forwardly overlapping said retaining member, and transverse rear end portions rearwardly overlapping said rear end surface of said printhead body portion.

3. The printhead assembly of claim 2 wherein:

said retainer member is a generally plate-shaped member.

4. The printhead assembly of claim 1 wherein:

said printhead body portion is formed from a piezoceramic material.

5. A printhead assembly for use in an ink jet printer, said printhead assembly comprising:

a printhead body portion formed from a piezoelectric material and having a front end surface, a rear end surface, opposite side surfaces extending between said front and rear end surfaces, and a spaced apart interior series of ink delivery chambers having discharge portions opening outwardly through said front end surfaces;

a removable orifice plate having a spaced series of ink discharge orifices therethrough, between opposite sides thereof, and being alignable with said discharge portions of said ink delivery chambers;

a retainer housing member having a front side opening and a rear side recess having a first outer portion, and a second inner portion disposed between said front side opening and said first outer portion and communicating with said front side opening, said first outer portion closely and removably receiving a front end portion of said printhead body portion, and said second inner portion closely receiving said orifice plate and captively retaining said orifice plate against said front end surface of said printhead body portion, with said ink discharge orifices in alignment with said discharge portions of said ink delivery chambers; and a resilient mounting structure forcibly holding said retainer housing member on said front end portion of said printhead body portion, said resilient mounting structure including a pair of elongated resilient mounting portions longitudinally extending along said opposite side surfaces of said printhead body portion, front end portions engaging said retainer housing member and exerting a rearwardly directed holding force thereon, and rear end portions engaging said rear end surface of said printhead body portion and exerting a forwardly directed holding force thereon.

6. The printhead assembly of claim 5 wherein:

said second inner portion of said rear side recess of said retainer housing member is smaller in cross-section, and is generally centered with respect to, said first outer portion of said rear side recess of said retainer housing member.

7. The printhead assembly of claim 5 wherein:

said resilient mounting portions are a pair of elongated spring clip members longitudinally extending along said opposite side surfaces of said printhead body portion, each of said resilient mounting portions having front end portions formed integrally with said retainer housing member, and transverse rear end portions rearwardly overlapping and forcibly and releasably engaging said rear end surface of said printhead body portion.

8. The printhead assembly of claim 5 wherein:

said resilient mounting portions are a pair of elongated spring clip members removably carried on said printhead assembly and longitudinally extending along said opposite side surfaces of said printhead body portion, each of said resilient mounting portions having transverse front end portions forwardly overlying and forcibly engaging the front side of said retainer housing member, and transverse rear end portions rearwardly overlying and forcibly engaging said rear end surface of said printhead body portion.

9. The printhead assembly of claim 5 wherein:

said printhead body portion is formed from a piezoceramic material.

* * * * *